United States Patent
Gagliardi, Jr.

(10) Patent No.: US 7,008,313 B2
(45) Date of Patent: Mar. 7, 2006

(54) METHOD OF MAKING FOOD PRODUCTS FROM THE THIGH OF A BIRD AND FOOD PRODUCTS MADE IN ACCORDANCE WITH THE METHOD

(75) Inventor: Eugene D. Gagliardi, Jr., Atglen, PA (US)

(73) Assignee: Skippack Creek Corporation, Wilmington, DE (US)

( * ) Notice: Subject to any disclaimer, the term of this patent is extended or adjusted under 35 U.S.C. 154(b) by 0 days.

(21) Appl. No.: 11/125,668

(22) Filed: May 10, 2005

(65) Prior Publication Data

US 2005/0266785 A1     Dec. 1, 2005

Related U.S. Application Data

(60) Provisional application No. 60/570,780, filed on May 13, 2004, provisional application No. 60/570,781, filed on May 13, 2004.

(51) Int. Cl.
*A22C 17/04* (2006.01)

(52) U.S. Cl. ...................................... 452/135; 426/480

(58) Field of Classification Search ................ 452/135, 452/136, 138, 166; 426/480, 518, 644
See application file for complete search history.

(56) References Cited

U.S. PATENT DOCUMENTS

| | | | |
|---|---|---|---|
| 5,266,064 A * | 11/1993 | Gagliardi, Jr. | 452/135 |
| 5,284,669 A * | 2/1994 | Gagliardi, Jr. | 426/480 |
| 5,437,572 A * | 8/1995 | Billington, III | 452/136 |
| 6,712,686 B1 * | 3/2004 | Markert et al. | 452/160 |

* cited by examiner

Primary Examiner—Thomas Price
(74) Attorney, Agent, or Firm—Akin Gump Strauss Hauer & Feld, LLP

(57) ABSTRACT

A method of cutting the thigh of a bird forms a boneless thigh meat product. The thigh has a bone, first and second lateral sides, top and bottom surfaces, a thin muscle proximate the first lateral side and a thick muscle proximate the second lateral side. The method comprises removing the bone and any other inedible components from the thigh to provide a boneless thigh. The boneless thigh is cut from the top surface to the bottom surface along a first cut line to remove the thin muscle. The thick muscle is cut along a second cut line extending generally parallel to the top surface to remove a small top (red) muscle. The thick muscle is then cut along a third cut line extending generally parallel to the top and bottom surfaces and generally half way between the top and bottom surfaces to create two generally equal sized thigh meat pieces. The generally equally sized thigh meat pieces are cut along a plurality of generally parallel, generally equally spaced, generally longitudinally extending fourth cut lines to create a plurality of elongated boneless thigh meat strips.

10 Claims, 3 Drawing Sheets

METHOD OF MAKING FOOD PRODUCTS FROM THE THIGH OF A BIRD AND FOOD PRODUCTS MADE IN ACCORDANCE WITH THE METHOD

CROSS-REFERENCE TO RELATED APPLICATIONS

This application claims the benefits of U.S. Provisional Patent Applications Nos. 60/570,780 and 60/570,781 both filed May 13, 2004, both entitled "Method of Making a Food Product from the Thigh of a Bird and Food Product Produced in Accordance with the Method", the subject matter of each of which is hereby incorporated herein by reference.

BACKGROUND OF THE INVENTION

The present invention relates generally to a method of making food products from a bird and, more particularly, to a method of making boneless food products from the thigh of a bird and the food products made in accordance with the method.

Birds, such as poultry and fowl, are conventionally eviscerated, dressed and sold either as a whole bird or as severed parts, i.e., breasts, wings, etc. One of the parts which is often separated and sold is the upper portion of the bird leg generally referred to as the thigh. Typically, thighs are sold with the skin in place and with the thigh meat surrounding an elongated bone generally extending along the middle of the thigh from one end of the thigh to the other end.

In recent years, there has been an increasing demand for innovative meat products, particularly products which require less time for preparation and which include little or no waste. There has also been an increasing demand for meat products which are boneless or substantially boneless, making such products easier to consume. Hence, products such as boneless chicken breasts, chicken tenders, etc. have enjoyed great commercial success. Other innovative products comprising "finger food" such as hot wings, buffalo wings, etc. have also obtained enhanced popularity for the respective parts from which they are prepared.

Until recently, some bird parts such as thighs have not been particularly amenable to such enhanced commercial processing and/or preparation methods for a variety of reasons related to the type of meat (dark versus light), the size and centralized location of the bone, etc. The present invention comprises a method of making unique food products from thigh meat. The food products are boneless and relatively small in size and therefore are easily consumable as "finger food".

BRIEF SUMMARY OF THE INVENTION

Briefly stated, in one embodiment, the present invention comprises a method of cutting the thigh of a bird to form a boneless thigh meat product, the thigh having a bone, first and second lateral sides, top and bottom surfaces, a thin muscle proximate the first lateral side and a thick muscle proximate the second lateral side. The method comprises removing the bone and any other inedible components from the thigh to provide a boneless thigh and cutting the boneless thigh from the top surface to the bottom surface along a first cut line to remove the thin muscle. The thick muscle is cut along a second cut line extending generally parallel to the top surface to remove a small top (red) muscle and along a third cut line extending generally parallel to the top and bottom surfaces and generally half way between the top and bottom surfaces to create two generally equal sized thigh meat pieces. The generally equally sized thigh meat pieces are each cut along a plurality of generally parallel, generally equally spaced, generally longitudinally extending fourth cut lines to create a plurality of elongated boneless thigh meat strips.

In another embodiment, the present invention comprises a method of cutting the thigh of a bird to form a boneless thigh meat product, the thigh having a bone, first and second lateral sides, top and bottom surfaces, a thin muscle proximate the first lateral side and a thick muscle proximate the second lateral side. The method comprises removing the bone and any other inedible components from the thigh to provide a boneless thigh and cutting the boneless thigh from the top surface to the bottom surface along a first cut line to remove the thin muscle. The thick muscle is cut along a second cut line extending generally parallel to the top surface to remove a small top (red) muscle and along a third cut line extending generally parallel to the top and bottom surfaces and generally half way between the top and bottom surfaces from a first longitudinal end toward but not completely to a second longitudinal end and separating the cut portions to create an elongated, thin boneless thigh meat product.

In yet another embodiment, the present invention comprises a method of cutting a boneless thigh of a bird to form a boneless thigh meat product, the thigh having first and second lateral sides, top and bottom surfaces, a thin muscle proximate the first lateral side and a thick muscle proximate the second lateral side. The method comprises cutting the boneless thigh from the top surface to the bottom surface along a first cut line to remove the thin muscle. The thick muscle is cut along a second cut line extending generally parallel to the top surface to remove a small top (red) muscle and along a third cut line extending generally parallel to the top and bottom surfaces and generally half way between the top and bottom surfaces to create two generally equal sized thigh meat pieces. The generally equally sized thigh meat pieces are cut along a plurality of generally parallel, generally equally spaced, generally longitudinally extending fourth cut lines to create a plurality of elongated boneless thigh meat strips.

In a further embodiment, the present invention comprises a method of cutting a boneless thigh of a bird to form a boneless thigh meat product, the thigh having first and second lateral sides, top and bottom surfaces, a thin muscle proximate the first lateral side and a thick muscle proximate the second lateral side. The method comprises cutting the boneless thigh from the top surface to the bottom surface along a first cut line to remove the thin muscle. The thick muscle is cut along a second cut line extending generally parallel to the top surface to remove a small top (red) muscle. The thick muscle is cut along a third cut line extending generally parallel to the top and bottom surfaces and generally half way between the top and bottom surfaces from a first longitudinal end toward but not completely to a second longitudinal end and separating the cut portions to create an elongated, thin boneless thigh meat product.

BRIEF DESCRIPTION OF THE SEVERAL VIEWS OF THE DRAWINGS

The foregoing summary as well as the following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
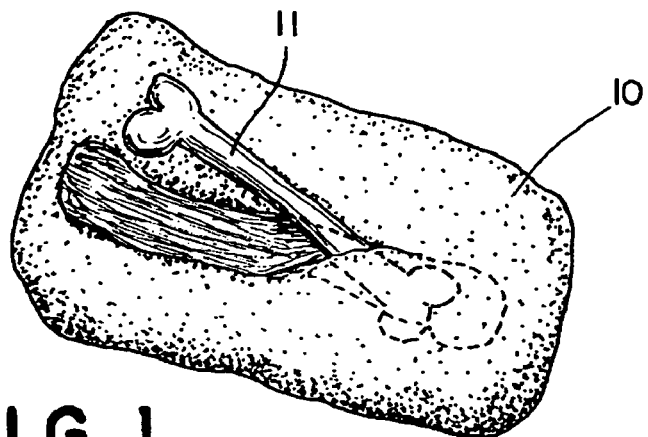
FIG. 1 is a top perspective view of a chicken thigh showing the removal of the bone and attached inedible components.

Referring to the drawings in detail wherein like numerals indicate like elements throughout the figures, there is shown in FIG. 1 a perspective view of a chicken thigh 10. Although in the presently described embodiments a chicken thigh 10 is employed for illustrating the present invention, one skilled in the art will understand that the present invention is equally applicable to any other poultry, fowl, or any other birds or the like. Accordingly, the present invention is not limited to a chicken thigh 10.

Figure 2:
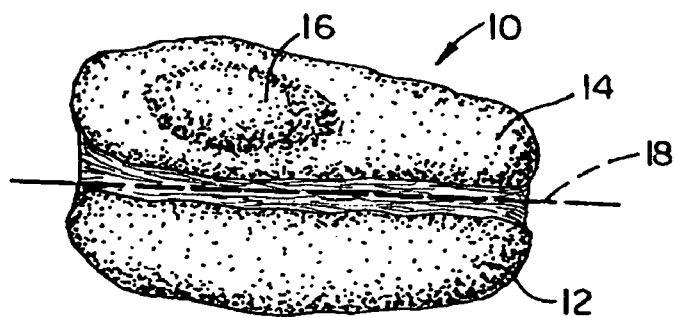
FIG. 2 is a top perspective view of the chicken thigh of FIG. 1 after the bone and attached inedible components have been removed and showing a first cut line.

As shown in FIG. 1, the chicken thigh 10 originally contains a generally centrally located bone 11 and associated or attached inedible components such as the knee cap and related cartilage. The first step in the present embodiment is to remove and dispose of the bone 11 and any related or attached inedible components in a manner well known to those skilled in the art. The resulting "boneless" chicken thigh 10 is shown in FIG. 2. It should be understood that the present invention is equally applicable to a chicken thigh from which the bone and other inedible components have previously been removed leaving just the thigh meat and skin in place. If desired, the skin could also be removed.

As shown in FIG. 2, the boneless thigh meat 10 includes a smaller, thin muscle 12 located on a first lateral side of where the thigh bone 11 had been and a larger, thick muscle 14 located on a second lateral side of where the thigh bone 11 had been. As is also shown in FIG. 2, the larger, thick muscle 14 includes a smaller, generally round top muscle known as the "red" muscle 16 on the upper surface thereof.

The next step in the present method is to separate the thin muscle 12 from the thick muscle 14 by making a first cut from the top surface to the bottom surface along a first cut line 18 which extends generally along the path of the removed bone 11. The first cut and the other below described cuts may be made using a knife, saw, water knife or any other suitable cutting instrument or device known to those skilled in the art. The thin muscle 12 is then removed and used in some other manner or is otherwise disposed of. Alternatively, the thin muscle 12 may also be subjected to the below described method steps.

Figure 3:
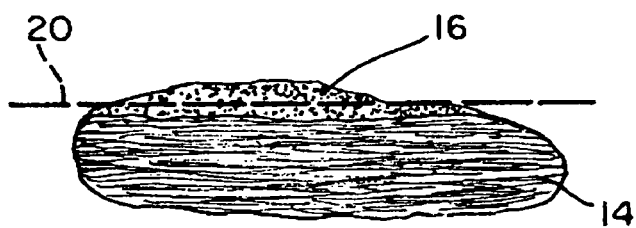
FIG. 3 is a side elevational view of a portion of the meat of the thigh of FIG. 2 and showing a second cut line.

The next step in the present method is to remove the red muscle 16 from the thick muscle 14 by making a second cut along a second cut line 20 which is generally parallel to the top surface of the thick muscle 14 as shown in FIG. 3. Preferably, the second cut line 20 is along a seam extending between the thick muscle 14 and the attached red muscle 16. The red muscle 16 is then removed and used in some other manner or is otherwise disposed of. After making the second cut, the thick muscle 14 is generally rectangularly shaped and of a generally uniform thickness as shown in FIGS. 4 and 5.

Figure 5:
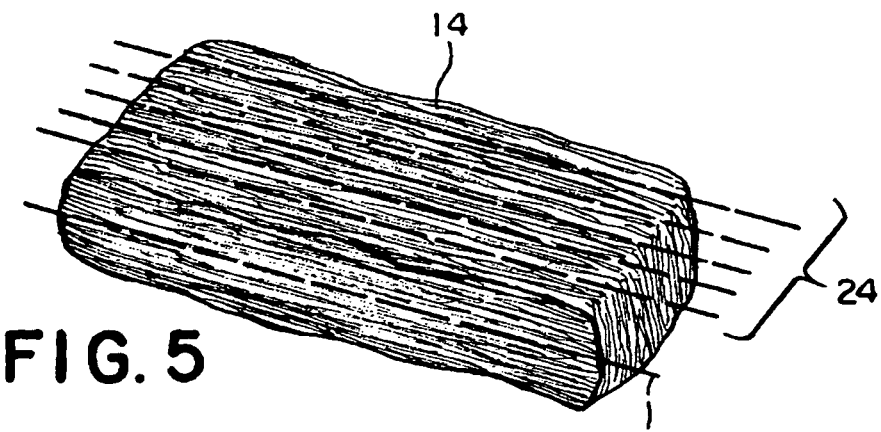
FIG. 5 is a perspective view of the thigh meat portion of FIG. 4 showing third and fourth cut lines.
Figure 6:
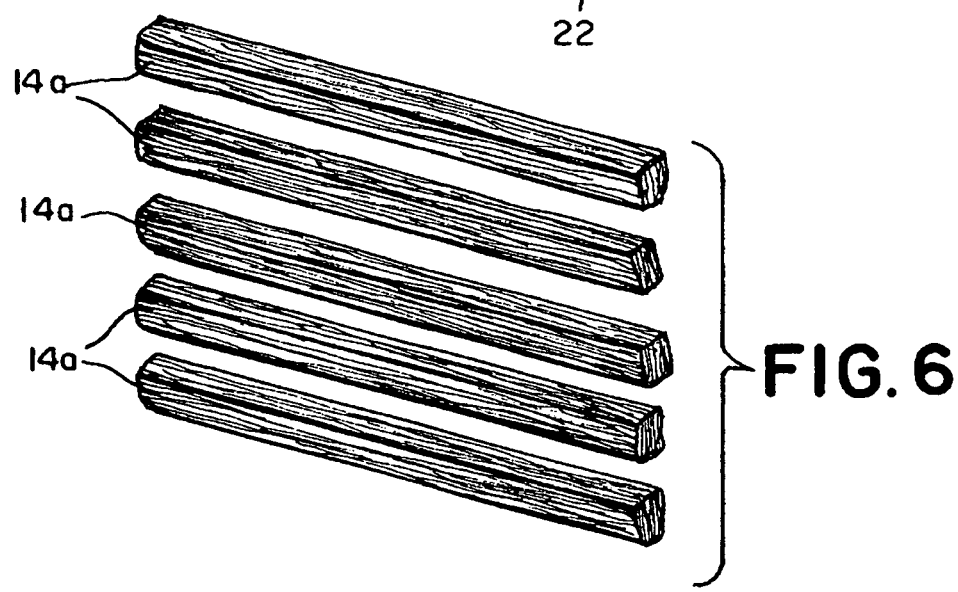
FIG. 6 is a perspective view of a plurality of elongated chicken thigh products made by cutting the thigh meat portion of FIG. 5 along the third and fourth cut lines.

The next step in the present method is to make a cut along a third cut line 22 which is shown in FIG. 5 as extending generally laterally from side to side through the thick muscle 14 and generally parallel to the top and bottom surfaces. The third cut is generally one half of the distance between the top and bottom surfaces so that it essentially separates the thick muscle 14 into two generally equal sized thin thigh pieces, with each thigh piece being approximately half of the thickness of the thick muscle 14.

Figure 4:
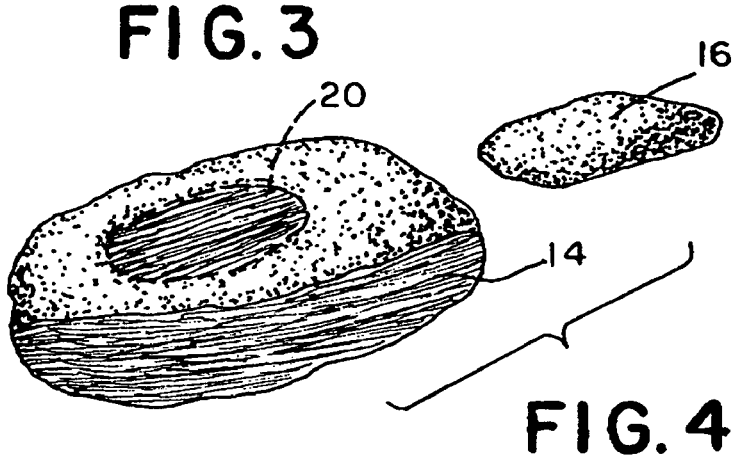
FIG. 4 is a perspective view of the thigh meat portion of FIG. 3 after the removal of the "red" muscle.

In the final step, the two generally equally sized thigh pieces of the thick muscle 14 are cut along a plurality of generally parallel, generally equally spaced, fourth cut lines 24 extending generally longitudinally as shown in FIG. 4. The cuts along the fourth cut lines 24 may be made utilizing a knife or any other suitable cutting device. For example, the cuts along the fourth cut lines 24 may be made utilizing a cutting apparatus of the type illustrated by FIG. 3 of U.S. Pat. No. 5,266,064, the disclosure of which is hereby incorporated herein by reference. Once the cuts are made along the fourth cut lines 24, the resulting thigh meat products 14a resemble the meat products shown as the output of the cutting apparatus illustrated by FIG. 3 of U.S. Pat. No. 5,266,064. Preferably the distance between the fourth cut lines 24 is generally equal to the thickness of the two thigh pieces of the thick muscle 14. The resulting thigh meat products 14a are boneless chicken thigh based finger food strips which can be prepared or cooked in any known manner such as frying, baking, etc. Preferably the strips are generally square in end view but could be some other shape, such as rectangular, if desired. The resulting thigh meat products 14a may also be marinated, if desired, battered/breaded or coated with a suitable sauce such as barbecue sauce, if desired.

Figure 7:
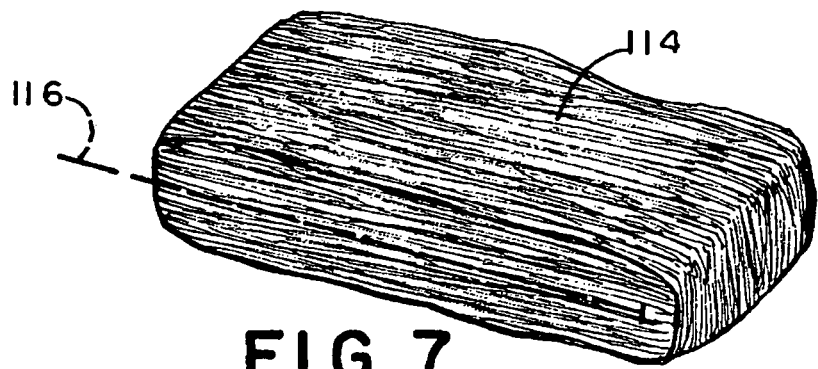
FIG. 7 is a perspective view of a thigh meat portion similar to FIG. 5 showing a cut line to illustrate a second preferred embodiment in accordance with the present invention.
Figure 8:
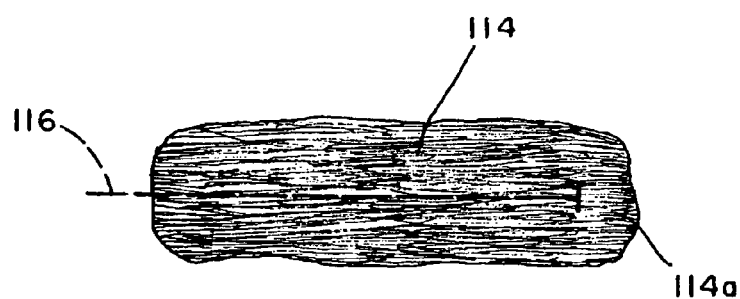
FIG. 8 is a side elevational view of the thigh meat portion of FIG. 7.
Figure 9:
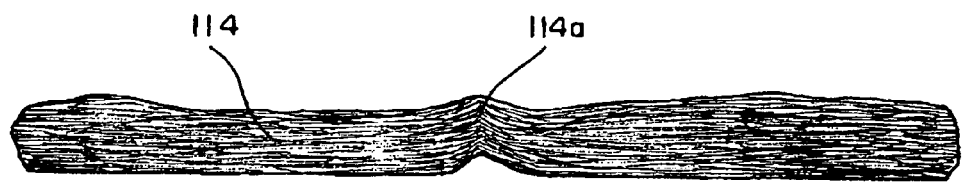
FIG. 9 is a perspective view of a chicken thigh product made by cutting the thigh meat portion of FIG. 7 along the illustrated cut line.

FIGS. 7–9 illustrate a second preferred embodiment of the present method. FIG. 7 is a perspective view of a large thigh muscle 114 which has had the red muscle already removed. FIGS. 7 and 8 each show a cut line 116 which extends along most but not all of the thigh muscle 114 from a first longitudinal end (the left end when viewing FIGS. 7 and 8) to near the second longitudinal end (right end when viewing FIGS. 7 and 8). The cut line 116 is generally parallel to the top and bottom surfaces of the large thigh muscle 114 and is about half way between the top and bottom surfaces so that the thicknesses of the portions of the large thigh muscle 114 both above and below the cut line 116 are about the same. A cut is made along the cut line 116 from the left side of the large thigh muscle 114 toward but stopping short of the right side to effectively "butterfly" the large thigh muscle 114 and thereby create a longer, thinner thigh meat produced 114a as shown in FIG. 9. The resulting thigh meat product 114a is a thin boneless chicken thigh based finger food product which can be prepared or cooked in any known manner such as frying, baking, etc. The resulting thigh meat product 114a may also be marinated, if desired, battered/breaded or coated with a suitable sauce such as barbecue sauce, if desired.

From the foregoing it can be seen that the present invention comprises a method of cutting the thigh of a bird to produce two different thigh meat products, both of which are boneless and suitable for finger food. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of cutting the thigh of a bird to form a boneless thigh meat product, the thigh having a bone, first and second lateral sides, top and bottom surfaces, a thin muscle proximate the first lateral side and a thick muscle proximate the second lateral side, the method comprising the steps of:
   removing the bone and any other inedible components from the thigh to provide a boneless thigh;
   cutting the boneless thigh from the top surface to the bottom surface along a first cut line to remove the thin muscle;
   cutting the thick muscle along a second cut line extending generally parallel to the top surface to remove a small top (red) muscle;
   cutting the thick muscle along a third cut line extending generally parallel to the top and bottom surfaces and generally half way between the top and bottom surfaces to create two generally equal sized thigh meat pieces; and
   cutting the generally equally sized thigh meat pieces along a plurality of generally parallel, generally equally spaced, generally longitudinally extending fourth cut lines to create a plurality of elongated boneless thigh meat strips.

2. The method as recited in claim 1 wherein the spacing between the fourth cut lines is generally equal to the thickness of the two generally equally sized thigh meat pieces so that the width and thickness of the thigh meat strips are generally equal.

3. An elongated boneless thigh meat strip made in accordance with the method of claim 1.

4. A method of cutting the thigh of a bird to form a boneless thigh meat product, the thigh having a bone, first and second lateral sides, top and bottom surfaces, a thin muscle proximate the first lateral side and a thick muscle proximate the second lateral side, the method comprising the steps of:
   removing the bone and any other inedible components from the thigh to provide a boneless thigh;
   cutting the boneless thigh from the top surface to the bottom surface along a first cut line to remove the thin muscle;
   cutting the thick muscle along a second cut line extending generally parallel to the top surface to remove a small top (red) muscle; and
   cutting the thick muscle along a third cut line extending generally parallel to the top and bottom surfaces and generally half way between the top and bottom surfaces from a first longitudinal end toward but not completely to a second longitudinal end and separating the cut portions to create an elongated, thin boneless thigh meat product.

5. An elongated, thin boneless thigh meat product made in accordance with the method of claim 4.

6. A method of cutting a boneless thigh of a bird to form a boneless thigh meat product, the thigh having first and second lateral sides, top and bottom surfaces, a thin muscle proximate the first lateral side and a thick muscle proximate the second lateral side, the method comprising the steps of:
   cutting the boneless thigh from the top surface to the bottom surface along a first cut line to remove the thin muscle;
   cutting the thick muscle along a second cut line extending generally parallel to the top surface to remove a small top (red) muscle;
   cutting the thick muscle along a third cut line extending generally parallel to the top and bottom surfaces and generally half way between the top and bottom surfaces to create two generally equal sized thigh meat pieces; and
   cutting the generally equally sized thigh meat pieces along a plurality of generally parallel, generally equally spaced, generally longitudinally extending fourth cut lines to create a plurality of elongated boneless thigh meat strips.

7. The method as recited in claim 6 wherein the spacing between the fourth cut lines is generally equal to the thickness of the two generally equally sized thigh meat pieces so that the width and thickness of the thigh meat strips are generally equal.

8. An elongated boneless thigh meat strip made in accordance with the method of claim 6.

9. A method of cutting a boneless thigh of a bird to form a boneless thigh meat product, the thigh having first and second lateral sides, top and bottom surfaces, a thin muscle proximate the first lateral side and a thick muscle proximate the second lateral side, the method comprising the steps of:
   cutting the boneless thigh from the top surface to the bottom surface along a first cut line to remove the thin muscle;
   cutting the thick muscle along a second cut line extending generally parallel to the top surface to remove a small top (red) muscle; and
   cutting the thick muscle along a third cut line extending generally parallel to the top and bottom surfaces and generally half way between the top and bottom surfaces from a first longitudinal end toward but not completely to a second longitudinal end and separating the cut portions to create an elongated, thin boneless thigh meat product.

10. An elongated, thin boneless thigh meat product made in accordance with the method of claim 9.

* * * * *